United States Patent [19]

Trumbull et al.

[11] Patent Number: 4,874,162
[45] Date of Patent: * Oct. 17, 1989

[54] MOTION PICTURE AMUSEMENT RIDE

[75] Inventors: Douglas Trumbull, Santa Monica; David Collins, Westlake Village; Wayne Smith, Los Angeles, all of Calif.; Robert Spieldiener, Vaduz, Switzerland

[73] Assignee: Showscan Film Corporation, Culver City, Calif.

[*] Notice: The portion of the term of this patent subsequent to Jun. 21, 2005 has been disclaimed.

[21] Appl. No.: 270,352

[22] Filed: Nov. 14, 1988

Related U.S. Application Data

[63] Continuation of Ser. No. 121,122, Nov. 16, 1987, Pat. No. 4,798,376, which is a continuation of Ser. No. 811,104, Dec. 19, 1985, Pat. No. 4,752,065.

[51] Int. Cl.$^4$ ............................................. A63G 31/16
[52] U.S. Cl. ...................................... 272/18; 352/85
[58] Field of Search ............... 272/16, 17, 18; 352/48, 352/85, 132

[56] References Cited

U.S. PATENT DOCUMENTS

| | | | |
|---|---|---|---|
| 1,232,407 | 7/1917 | Thome | 272/18 |
| 3,865,430 | 2/1975 | Tanus | 272/18 X |
| 4,066,256 | 1/1979 | Trumbull | 272/18 |
| 4,798,376 | 1/1989 | Trumbull et al. | 272/18 |

Primary Examiner—Richard E. Chilcot, Jr.
Attorney, Agent, or Firm—Freilich Hornbaker Rosen & Fernandez

[57] ABSTRACT

An amusement ride is provided, of the type that moves and tilts passengers viewing a motion picture, which is more versatile than prior rides. A plurality of passenger-holding frames is provided, that are all moved in sychronism, each by a separate set of actuators, while the passengers view a stationary screen. The passenger-holding frame is pivoted up and down on a beam which is supported by only two largely vertical actuators, while two pairs of links or arms limit movement of the beam.

2 Claims, 3 Drawing Sheets

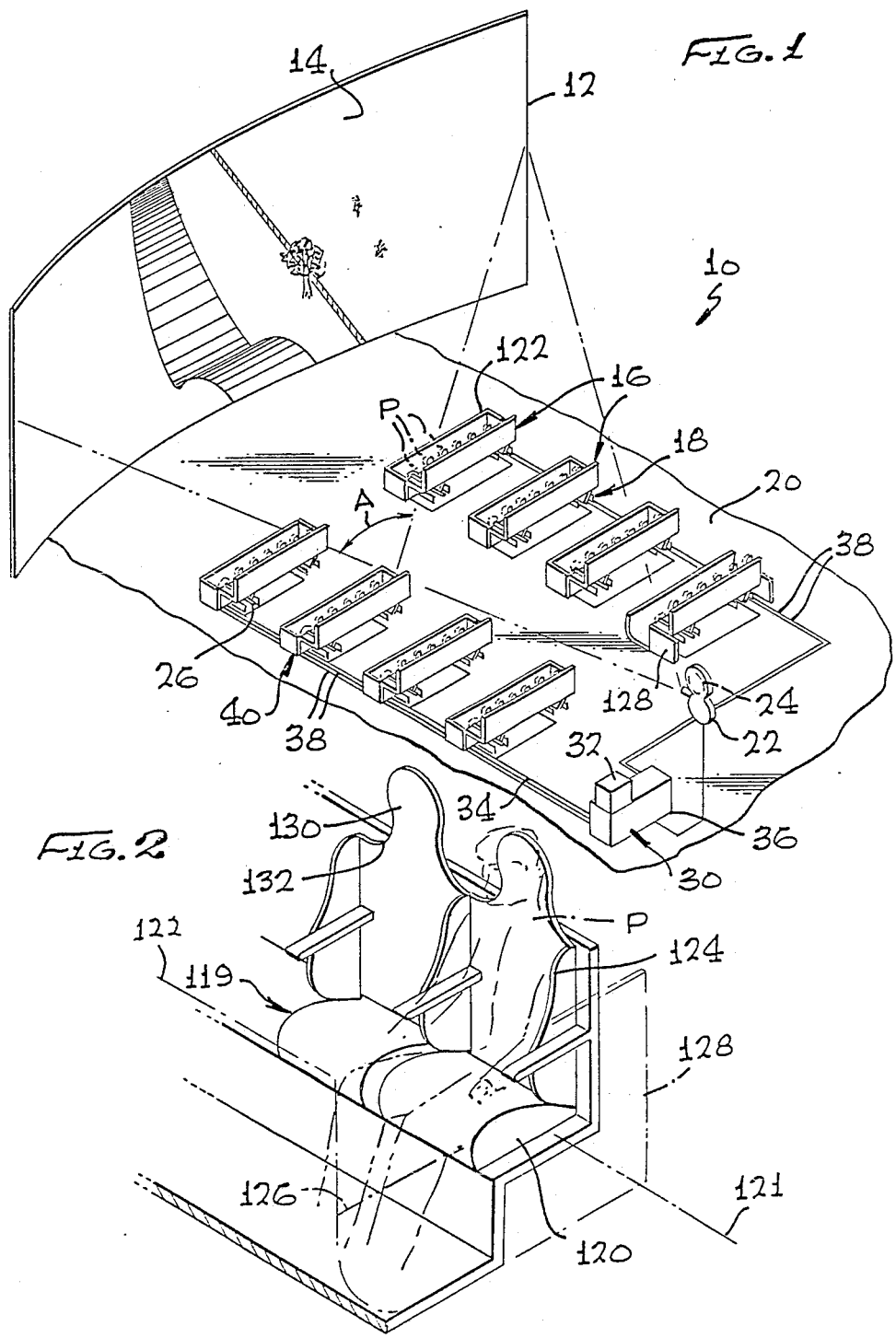

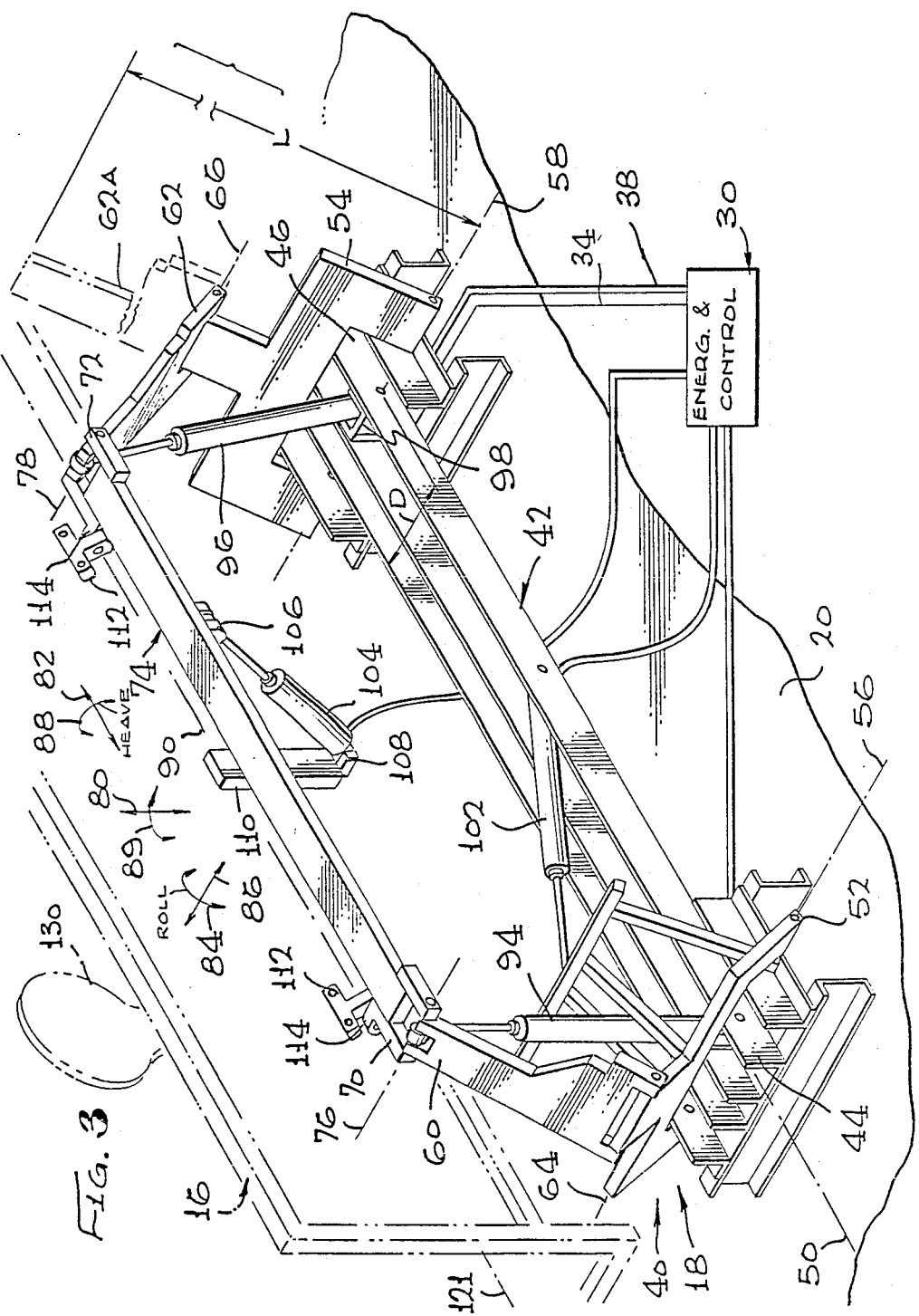

MOTION PICTURE AMUSEMENT RIDE

This is a continuation of application Ser. No. 121,122, filed Nov. 16, 1987, now U.S. Pat. No. 4,798,376, which is a continuation of application Ser. No. 811,104, filed Dec. 19, 1985, now U.S. Pat. No. 4,752,065.

BACKGROUND OF THE INVENTION

An entertaining effect can be obtained by displaying a motion picture representing a view from a moving vehicle such as a roller coaster car, an airplane flying low over the ground, or a car racing through streets, while moving the viewers or passengers. The passengers are moved short distances vertically and are tilted, in sychronism with the motion picture, so they experience forces similar to those of a passenger in the vehicle whose view is represented by the motion picture. U.S. Pat. No. 4,066,256 by Trumbull describes an amusement ride of this type, wherein two or three rows of passengers and a motion picture screen all lie in a large enclosure supported by three largely vertical hydraulic actuators.

Only a limited number of passengers can be accommodated in the type of apparatus of the above-identified patent. This is because the apparatus is unwieldy if a large number of passengers has to be accommodated together with a corresponding large motion picture screen and projector. For example, to tilt all passengers rearwardly by a particular moderate angle to simulate acceleration, it would be necessary to raise the front of the apparatus and lower the back by a large distance, which would result in passengers at the rear experiencing larger vertical acceleration forces than those at the middle. A problem is that if the apparatus does not hold a large number of passengers, it is difficult to operate the apparatus economically. A less expensive amusement ride of the type which simulated the forces on passengers viewing a motion picture, would be of considerable value.

SUMMARY OF THE INVENTION

In accordance with one embodiment of the present invention, an amusement ride is provided of the type which subjects passengers to forces similar to those of passengers in a moving vehicle whose view is represented by a motion picture image, which provides enhanced entertainment in an economical manner. The apparatus includes a plurality of passenger-holding frames which each comprise a separate drive means including a separate set of actuators. All of the frames are placed to view a single large screen on which a motion picture image is projected. The screen can be stationary while each of the passenger-holding frames moves in synchronism.

Each drive means for moving a passenger-holding frame can include a pair of links or arms that support a beam in vertical and lateral motion while resisting back and forth motion. The passenger-holding frame is pivotally mounted on the beam so the frame can be tilted to pivot the passengers forward or backward.

The novel features of the invention are set forth with particularity in the appended claims. The invention will be best understood from the following description when read in conjunction with the accompanying drawings.

BRIEF DESCRIPTION OF THE DRAWINGS

FIG. 1 is a rear and left perspective view of an amusement ride apparatus or system constructed in accordance with the present invention.

FIG. 2 is a partial front and left perspective view of the apparatus of FIG. 1.

FIG. 3 is a left rear perspective view of one of the drive means of the system of FIG. 1.

DESCRIPTION OF THE PREFERRED EMBODIMENT

Figure 4:
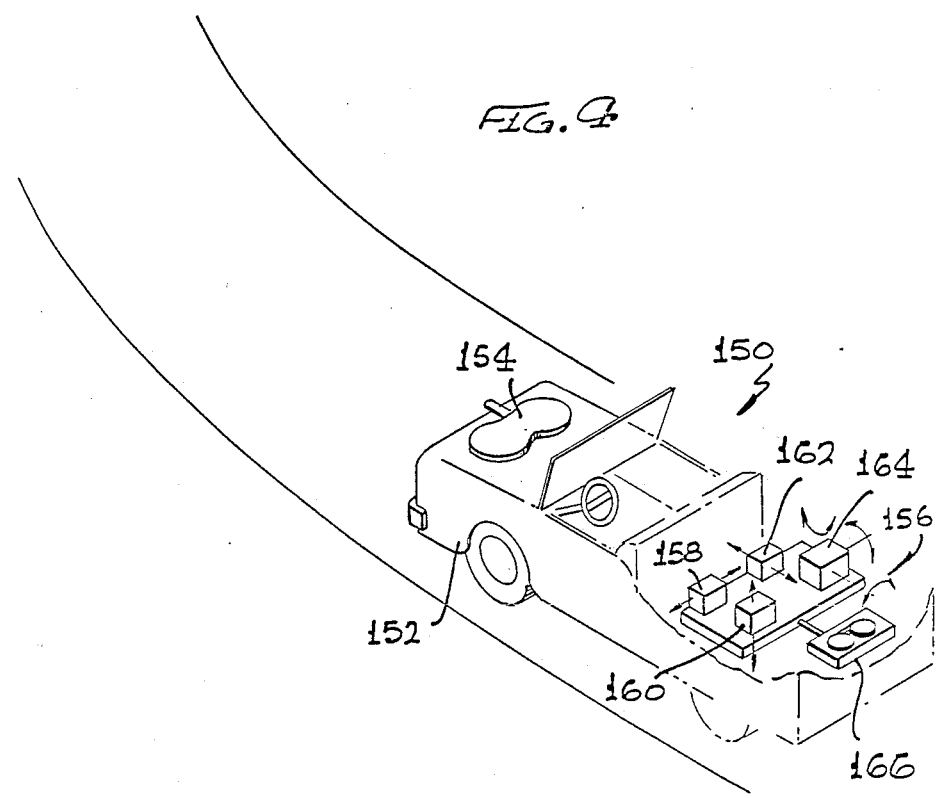
FIG. 4 is a rear perspective view of a motion picture camera, vehicle, and motion sensing apparatus which can be used to take the motion picture and a record of movement for use in the system of FIG. 1.

FIG. 1 illustrates an amusement ride system 10 which includes a screen 12 for displaying a motion picture image 14, and a group of passenger-holding frames 16. Each frame holds a group of passengers P who view the motion picture image. Each frame 16 is supported by a drive means 18 which supports the frame above the ground, or floor, 20 and which moves the frame in sychronism with the motion picture image. At least a portion of the image 14 represents a view from a rapidly moving vehicle, the particular image showing a view from a roller coaster car which is about to plunge down a steep incline. The drive means 18 can rapidly raise and lower the passengers and tilt or shift them, so they experience forces. The forces which they experience simulate the forces that would be felt if the passengers were in an actual vehicle executing the maneuvers indicated by the motion picture image 14. For example, as the imaginary roller coaster car in the image 14 starts down the roller coaster incline, the passenger-holding frame 16 can be suddenly lowered and tilted forward.

The screen 12 and a projector 22 which projects the image on the screen are both stationary, which permits a large screen having a wide angle of view to be easily used. The film 24 in the projector can include tracks that represent instructions to the set of actuators 26 of each drive means 18 which will cause appropriate movement of the passenger-holding frames. Alternatively, timing markings on the film can synchronize to another movement-control recording player. The electrical signal output of the projector 24 or other image creating means is delivered to an energizer and control device 30. The device 30 includes a control 32 which delivers electrical signals over lines 34 to each set of actuators 26 that control movements of the passenger-holding frames 16. The device 30 also includes a hydraulic energizer or pump 36 which delivers high pressure hydraulic fluid through hoses 38 to the actuators to power them.

FIG. 3 illustrates one unit 40 which includes a passenger-holding frame 16 and a drive means 18 for moving the frame. The drive means includes a base 42 mounted on the ground and having opposite ends 44, 46 that are spaced apart along a substantially horizontal lateral axis 50. A pair of lower arms 52, 54 are pivotally mounted on the base about a pair of largely parallel axes 56, 58 that are substantially horizontal and perpendicular to the base axes 50. A pair of upper arms 60, 62 each have a lower end pivotally mounted on a corresponding lower arm about a middle axes 64, 66 that is substantially parallel to the lower axes 56, 58. Each upper arm also has an upper end pivotally connected to the opposite ends 70, 72 of an upper beam 74 about a pair of upper axes 76, 78 that are substantially parallel to the lower axes. The pairs of upper and lower arms confine the upper beam 74 to vertical movement indicated by arrow 80, lateral movement indicated by arrow 82, and pivoting in roll indicated by arrows 84. However, the support for the upper beam prevents its longitudinal motion in the direction indicated by arrows 86 and also prevents upper beam pivoting in heave as indicated by arrow 88 (about an axis parallel to arrows 82). The support also prevents yaw pivoting (indicated by arrows 89) of the upper beam about a vertical axis.

In order to provide for pivoting or tilting in heave, of the passengers as indicated by arrows 88, the passenger frame 16 is mounted on the upper beam 74 so the frame can tilt about a laterally-extending frame axis 90.

Movement of the upper beam 74 in vertical motion and tilting in roll, indicated by arrows 80 and 84, is largely controlled by a pair of largely vertical actuators 94, 96. Each actuator is a double-acting hydraulic actuator which includes a voltage controlled valve 98 that controls movement of high-pressure hydraulic fluid received through hoses 38 from the energizing and control device 30. The lateral position of the upper beam 74 is controlled by a lateral actuator 102 which extends largely horizontal and largely parallel to the base axis 50. The roll angle (arrow 4) of the upper beam 74 is controlled by the relative lengths of the vertical actuators 94, 96. The average vertical height of the upper beam is controlled by the average lengths of the vertical actuators.

The passenger frame 16 can be pivoted in heave, as indicated by arrows 88, about the frame axis 90, by a double acting, voltage-control tilt actuator 104. The tilt actuator 104 is similar to the other actuators, except that it is smaller in length because a smaller length is sufficient for only tilt movement. The actuator 104 has one end 106 pivotally connected to the upper beam 74, and an opposite end 108 pivotally connected to a member 110 of the passenger-holding frame 16. It is noted that a pair of brackets 112 fixed to the passenger-holding frame support it in pivotal motion on parts 114 of the upper beam 74.

The upper and lower arms such as 60 and 52 serve to prevent pivoting of the upper beam 74 in the heave direction indicated by arrows 88. This allows the use of only two vertical actuators 94, 96 to control vertical motion of the passengers, and avoids the need for a third actuator that would have to be connected to a rearward extension of the upper beam 74 to pivot it in heave. The elimination of a third vertical actuator is important in enabling the unit 40 to be constructed so that it has a small length in the forward-rearward direction of longitudinal arrows 86. This small length permits the passenger-holding frames 16 of different units 40 to be spaced one behind the other, with each located only a moderate distance behind the one in front of it while still providing controlled pivoting in the heave direction of arrows 88. The distance D between opposite sides of each lower arm such as 54, at the location where the lower arm is adjacent to the base 42, is at least 10% of the length L of each pair of arms such as 54 and 62, when the arms are in line as indicated for the upper arm in position 62A.

FIGS. 1 and 2 show that each passenger-holding frame 16 includes a row 119 of passenger-holding seats 120 arranged along a row axis 121, the particular system shown including six seats in each row of seats of a frame. Each frame includes forward walls 122 that are opened above substantially the shoulder level indicated at 124 but that are closed below seat level as indicated at 126. The forward wall 122 is used to safeguard passengers against falling out of the frame while it is in motion. Seat bars can also be used for restraint. Side doors 128 are also provided to enable passengers to enter, and which are then slid closed to keep the hands and feet of passengers inside the frame.

Each seat includes a backrest with a headrest portion 130 in the form of a silhouette of a person's head, with the head portion being of about the same width (about 8") as the human head, and with a "necked" portion 132. This silhouette provides a substantially constant obstruction for passengers in the next frame behind the silhouettes, which minimizes their viewing of movements of the heads of passengers in front of them as the frame moves, without blocking spaces between the heads of passengers.

When the motion picture image 14 (FIG. 1) represents a vehicle suddenly accelerating downwardly (e.g., on a roller coaster), the frame is rapidly lowered and tilted downward so the passengers face at a small downward angle. Forward and backward horizontal acceleration can be simulated by tilting the passengers respectively upward and downward. When the image 14 represents a vehicle making a sharp turn, as to the right wherein centrifugal forces tend to throw a real vehicle passenger to the left, we can tilt the frame so that the left side 70 of the upper beam is lower than the right side 72. A variety of motions, including rapid reversals producing vibrations, can be created.

Figure 5:
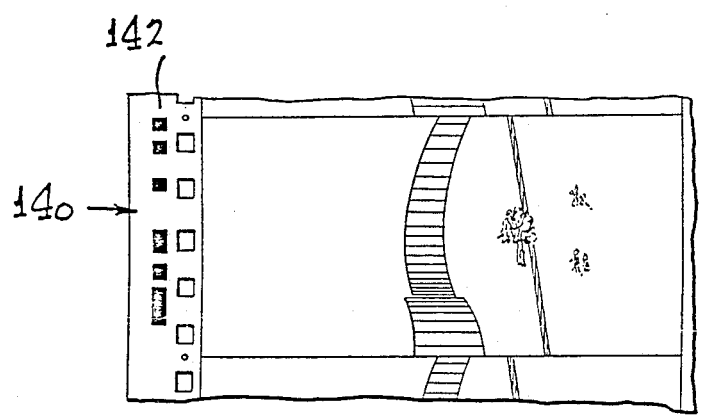
FIG. 5 is a plan view of a portion of film which can be used in the projector of FIG. 1.

Although it is possible to use manual controls for controlling movement of the passenger frames, it is generally desirable to use a record of desired movements. FIG. 5 shows a portion of a film strip 140 which includes a track 142 encoded to indicate movements of each of the actuators such as 94, 96, 102, and 104 associated with each pasenger-holding frame. The record can be on a tape cartridge which is sychronized with movement of the motion picture film. The recording can be made after the motion picture is filmed, by an expert operator, and refined through trial and error, or can be made by recording motions encountered during filming."

FIG. 4 illustrates a recording system 150 mounted on a moveable vehicle 152, and which includes a motion picture camera 154 that records a view seen from the moving vehicle and which will later form the motion picture image on a screen. The system also includes a motion detector apparatus 156 which includes a group of accelerometers 158, 160, 162 for measuring acceleration in three directions, and a rotation sensing instrument 164 for sensing the pivoting of the vehicle about each of three perpendicular axes. A recorder 166 is connected to the accelerometers and pivot sensing instrument to record accelerations and pivoting of the vehicle. A recording representing the information on the original recording, will be played during projection of the motion picture. As mentioned earlier, the vertical acceleration or the original vehicle is simulated by accelerating the passenger frame up and down; lateral or sideways acceleration can be simulated by moving the passenger frame sidewardly. Forward and rearward acceleration is largely simulated by tilting the passenger frame. Pivoting in pitch and roll (arrows 88 and 84 FIG. 3) are simulated by corresponding tilting of the passenger frame. Tilting in yaw (e.g., a car turning to the left or right) is simulated by tilting in roll and accelerating to the left or right to induce forces similar to those encountered when turning a vehicle left or right.

When passengers view the screen and they are accelerated by short distances or tilted, the fact that the screen does not also move has been found not to affect the entertainment effect. This is because the image on the screen is taken by a camera that will tilt. Passengers will generally view the middle of the screen where their attention is focused, and lack of movement of areas around the screen which are dark are found not to be significant. It is important that there be a significant angle of view of the screen from the passengers, and it is desirable that the angle of view A of most passengers be at least about 60 degrees in a horizontal plane. The relatively small depth of each unit made possible by the need to use only two laterally spaced vertical actuators, aids in keeping all passengers relatively close to the screen so a moderate size screen can be used.

Thus, the invention provides an amusement ride apparatus which can accommodate a significant number of passengers in a system of moderate cost. This can be accomplished by using a stationary screen and using a plurality of separate units that each includes a separate passenger-holding frame for holding a row of passengers, and with drive means coupled to each frame to individually move that frame, although all frames are moved in synchronism.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An amusement ride apparatus comprising:
   means for holding a plurality of passengers;
   image means including a screen viewable by said passengers and means for forming a predetermined motion picture image on said screen with at least a portion of said image representing the view from a moving vehicle;
   drive means for moving said passenger holding means in synchronism with said motion picture image to simulate, at least partially, forces that would be experienced by passengers in said moving vehicle;
   said means for holding passengers comprising a plurality of passenger-holding frames, said drive means comprising a plurality of sets of actuators, each said set of actuators associated with a different one of said frames and controllable to move the corresponding frame, and said drive means includes means for controlling said sets of actuators in synchronism;
   each said passenger-holding frame includes at least one seat positioned to hold a seated passenger facing in a predetermined forward direction towards said screen;
   each said set of actuators is constructed to tilt said seat about an axis (82) that extends primarily horizontally and perpendicular to said forward direction;
   each said frame being tiltable about its own individual said axis with said axis of one of said frames spaced further from said screen than said axis of a second of said frames.

2. An amusement ride apparatus for mounting above a floor comprising:
   means for holding a plurality of passengers;
   image means including a screen viewable by said passengers and means for forming a predetermined motion picture image on said screen with at least a portion of said image representing the view from a moving vehicle;
   drive means for moving said passenger holding means in synchronism with said motion picture to simulate, at least partially, forces that would be experienced by passengers in said moving vehicle;
   said means for holding passengers including a plurality of frames, each including at least one seat, with each seat constructed to hold a seated passenger facing in a predetermined forward direction toward said screen;
   said frames being separated, and including a first frame and a second frame spaced rearwardly from said first frame;
   said drive means including a first set of actuators coup to said first frame and constructed to move said first frame and said at least one seat thereof in a plurality of motions including tilting of said at least one seat about a first axis (82) extending substantially horizontally and perpendicular to said forward direction;
   said drive means also including a second set actuators lying rearward of said first set and coupled to said second frame and constructed to move said second frame and said at least one seat thereof about a second axis extending substantially parallel to said first axis but lying further from said screen than said first axis.

* * * * *